United States Patent [19]

Kodera et al.

[11] Patent Number: 4,611,549
[45] Date of Patent: Sep. 16, 1986

[54] ROTATION CONTROL SYSTEM FOR Z-TYPE PROPULSION APPARATUS

[75] Inventors: Masanori Kodera, Chigasaki; Yasuo Aizawa, Hiratsuka; Kohji Ichijo, Tokyo, all of Japan

[73] Assignee: Niigata Engineering Co., Ltd., Japan

[21] Appl. No.: 682,009

[22] PCT Filed: Mar. 30, 1984

[86] PCT No.: PCT/JP84/00158
§ 371 Date: Nov. 26, 1984
§ 102(e) Date: Nov. 26, 1984

[87] PCT Pub. No.: WO84/03871
PCT Pub. Date: Oct. 11, 1984

[30] Foreign Application Priority Data

| Mar. 30, 1983 | [JP] | Japan | 58-46140[U] |
| Sep. 29, 1983 | [JP] | Japan | 58-181333 |
| Oct. 3, 1983 | [JP] | Japan | 58-184885 |
| Mar. 26, 1984 | [JP] | Japan | 59-57562 |

[51] Int. Cl.⁴ .............................................. B63H 5/14
[52] U.S. Cl. ............................ 114/144 E; 74/480 B
[58] Field of Search ............ 114/144 E, 144 R; 318/628; 364/102; 340/146.1 BE; 74/480 R, 480 B; 440/53

[56] References Cited

U.S. PATENT DOCUMENTS

| 4,055,135 | 10/1977 | Wesner | 114/144 E |
| 4,301,759 | 11/1981 | De Vries | 114/144 E |
| 4,469,041 | 9/1984 | Bilen | 114/144 R |

FOREIGN PATENT DOCUMENTS

| 50-12198 | 5/1975 | Japan. | |
| 56-960 | 5/1982 | Japan | 114/144 E |

Primary Examiner—Trygve M. Blix
Assistant Examiner—Stephen P. Avila
Attorney, Agent, or Firm—Scully, Scott Murphy & Presser

[57] ABSTRACT

There is provided a rotation control system for a Z-type propulsion apparatus which can achieve an optimum turning of a vessel under any steering conditions of the vessel by controlling the rotation speed of a hollow rotary housing of the Z-type propulsion apparatus in accordance with the load exerted on the rotary housing, the number of revolution of a propeller provided in the rotary housing, or the combination thereof. A difference between a signal representative of an angle of a steering handle and a signal representative of an angle of the rotary housing is first detected. The detected signal, which is representative of the difference between the angle of the steering handle and the angle of the rotary housing, is then limited in accordance with the load exerted on the rotary housing, speed of the vessel, or the combination thereof, and the rotary housing is driven in accordance with the limited signal.

7 Claims, 16 Drawing Figures

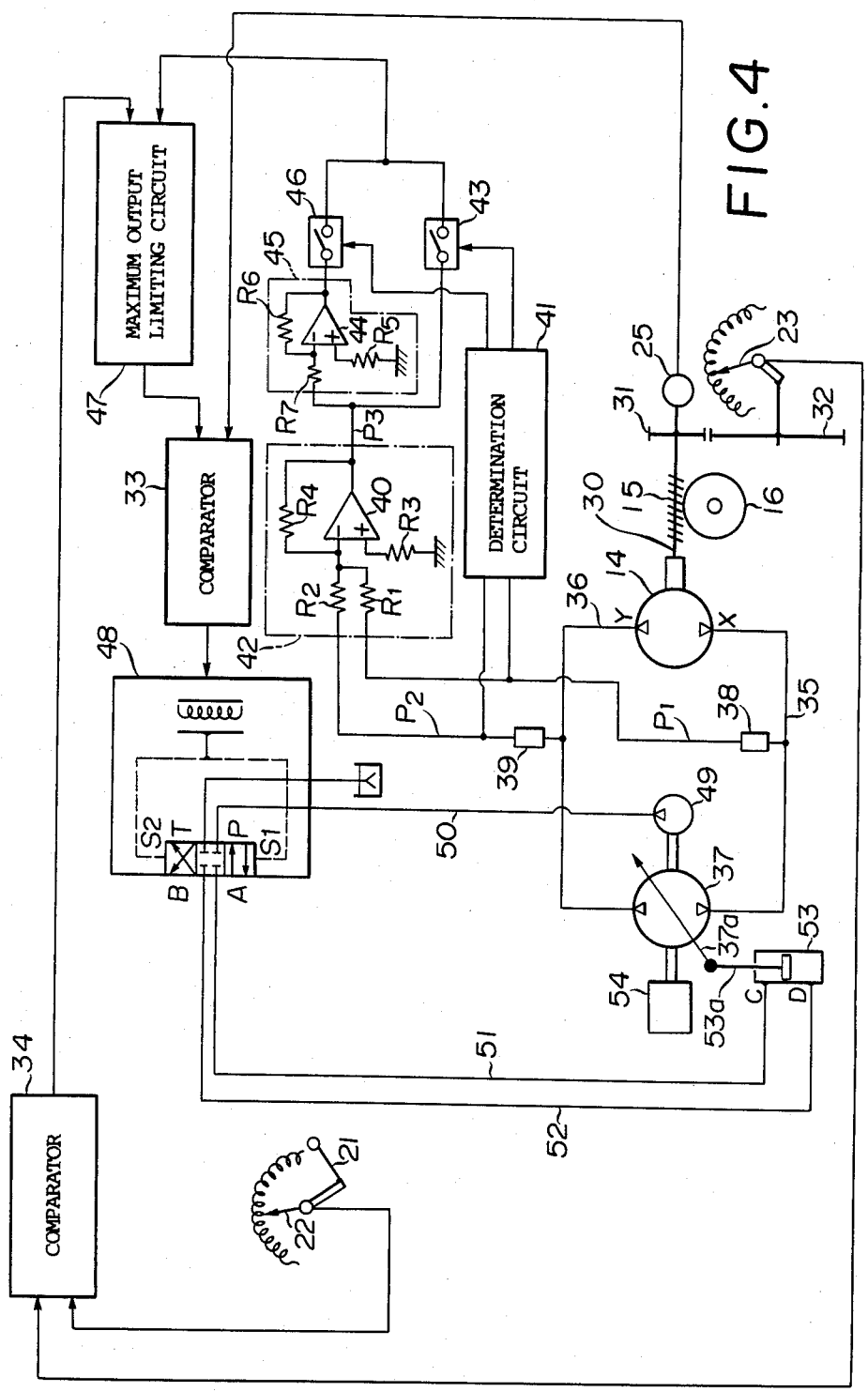

ROTATION CONTROL SYSTEM FOR Z-TYPE PROPULSION APPARATUS

FIELD OF THE INVENTION

This invention relates to a rotation control system for use in a vessel such as a tug boat.

BACKGROUND ART

In recent years, harbors have become much crowded with vessels of a large size, and therefore it has been required that tug boats should operate to move the vessel toward and away from the shore in a safe and rapid manner. For this reason, there have now been extensively used tug boats equipped with a Z-type propulsion apparatus which can easily vary the direction of propulsion over the range of 360 degrees. In such a Z-type propulsion apparatus, for example, shown in FIG. 1, the rotation of a main engine 1 is transmitted to an input shaft 6 via a universal joint 3, an intermediate shaft 4 and a universal joint 5 when a clutch 2 is connected, and the rotation of the input shaft 6 is transmitted to a propeller 12 attached to a propeller shaft 11 via bevel gears 7, 8, 9 and 10 so that the propeller 12 is rotated to advance the vessel. At the same time, the rotation of a hydraulic motor 14 controlled by a rotation control unit 13 is transmitted to a hollow rotary housing 17 via a worm gear 15 and a worm wheel 16 to angularly move the rotary housing 17 so that the direction of propulsion of the propeller 12 is changed to turn the vessel.

One conventional method of controlling the rotation of the Z-type propulsion apparatus is to control the speed of rotation of the hydraulic motor 14 with respect to the speed of rotation of the main engine 1. In such a conventional method, the main engine 1 drives a hydraulic pump so as to control the hydraulic motor 14. Alternatively, a motor drives the hydraulic pump to control the hydraulic motor 14. In the method in which the main engine 1 drives the hydraulic pump, the speed of rotation of the main engine 1 is detected and the angle of inclination of the hydraulic pump is controlled to be in inverse proportion to the speed of rotation of the main engine 1 so that the speed of rotation of the hydraulic motor 14 becomes constant. Alternatively, the speed of rotation of the hydraulic motor 14 is detected and the angle of inclination of the hydraulic pump is controlled so that the speed of rotation of the hydraulic motor 14 becomes constant.

Among these control methods, in the case where the vessel is equipped with the Z-type propulsion apparatus of the type by which a turning force exerted on the vessel is proportional to the square of the speed of travel of the vessel, it might be considered that the speed of rotation of the rotary housing is decreased to prevent an increase in the hydraulic drive force and an abrupt turning of the vessel when the speed of rotation of the main engine 1 is high. On the other hand, it might also be considered that when the speed of rotation of the main engine 1 is low, the speed of rotation of the rotary housing is increased to make use of the surplus of the hydraulic drive force and to rapidly turn the vessel.

However, vessels provided with such a Z-type propulsion apparatus are mostly used as tug boats. In the case where the tug boat has to carry out the mooring of a vessel, the speed of rotation of the main engine 1 is not always proportional to the speed of the boat or the number of revolution of the propeller. There are occasions when the speed of rotation of the main engine 1 is low while the speed of the boat is high and occasions when the speed of rotation of the main engine 1 is high while the speed of the boat is low. Therefore, in the method of controlling the speed of rotation of the rotary housing merely in inverse proportion to the speed of rotation of the main engine 1, the motor for driving the hydraulic pump is subjected to overload and is stopped by a safety device and also the hydraulic pump is damaged when the rotation of the main engine 1 is low while the speed of the boat is high (when the tug boat is tugged by the vessel). Also, when the speed of rotation of the main engine is high while the speed of the boat is low (when the tug boat tugs the vessel), a high speed of turning can not be achieved.

Another known rotation control system for controlling the turning of a vessel equipped with the Z-type propulsion apparatus is shown in FIG. 2. This system comprises a steering angle detector 22 for detecting the steering angle of a steering handle 21 for rotating a hollow rotary housing of the Z-type propulsion apparatus, a rotation angle detector 23 for detecting the rotation angle (follow-up angle) of the rotary housing 17, an error voltage generator 24 for comparing a detected value 81 of the steering angle detector 22 with a detected value 82 of the rotation angle detector 23 to output an error voltage, a rotation speed detector 25 for detecting the speed of rotation of the rotary housing 17, a servo circuit 25 for comparing the output of the error voltage generator 24 with the output of the rotation speed detector 25 to output a servo signal, a flow rate and direction control valve 27 such as an electromagnetic proportional control valve controlled by the servo signal, a hydraulic pump 29 connected to the flow rate and direction control valve 27 and driven by a motor 28, and a hydraulic motor 14 connected to the flow rate and direction control valve 27 and adapted to rotate the rotary housing 17 via a worm gear 15 and a worm wheel 16. As shown in FIG. 3, the error voltage generator 24 generates a voltage increasing in proportion to a difference of angle ($\theta 1-\theta 2$) when $-A$ (A is a positive constant value) $<$ difference of angle ($\theta 1-\theta 2$) $<A$ is provided, and also it generates a negative or a positive constant voltage when the difference of angle ($\theta 1-\theta 2$) $\leq -A$ or the difference of angle ($\theta 1-\theta 2$) $\geq A$ is provided. Therefore, the servo circuit 26 controls the flow rate and direction control valve 27 so that the voltage generated by the error voltage generator 24 coincides with the output of the rotation speed detector 25. As a result, the hydraulic motor 14 is operated in accordance with the output of the error voltage generator 24 to rotate the rotary housing 17.

However, in the above-mentioned rotation control system, the speed of rotation of the rotary housing is controlled in accordance with the error voltage shown in FIG. 3 irrespective of the speed of the vessel, and is always constant except when the difference of angle ($\theta 1-\theta 2$) is in the vicinity of 0. Therefore, even if the steering handle 21 is angularly moved at the same angle, the turning of the vessel is varied depending on the speed of the vessel. More specifically, when the speed of the vessel is high, the vessel is turned at a high speed. This is dangerous. And, when the speed of the vessel is low, the turning speed is lowered so that a small turn can not be achieved, thereby affecting a steering performance of the vessel. Therefore, with the conventional system, the operator must change the manner of steering the steering handle 21 in accordance with the speed of the vessel. Thus, the steering operation is difficult and much skill is required.

It is therefore an object of this invention to provide a rotation control system for a Z-type propulsion apparatus which is capable of steering a vessel to achieve an optimum turn irrespective of the speed of the vessel.

Another object is to provide such a rotation control system which enhances the ability of high speed turning of the vessel.

A further object is to provide such a rotation control system which is capable of turning the vessel in a manner commensurate with the load of a propulsion device.

A still further object is to provide a rotation control system which is capable of controlling a plurality of Z-type propulsion apparatuses mounted on a vessel such as a multishaft vessel and is capable of steering the vessel to achieve an optimum turn.

DISCLOSURE OF THE INVENTION

According to the present invention, there is provided a rotation control system which comprises a steering angle detector for detecting a steering angle of a steering handle which causes a hollow rotary housing of a Z-type propulsion apparatus to rotate, a rotation angle detector for detecting a rotation angle of the rotary housing, a difference-of-angle detecting circuit for detecting a difference between the steering angle and the rotation angle, a drive device for rotating the rotary housing, a load detector for detecting the load of the drive device, and a drive control circuit for limiting the output of the difference-of-angle detecting circuit in accordance with the output of the load detector so as to control the drive device in accordance with the limited output. A hydraulic motor may be used as the drive device in which case pressure detectors for detecting respectively pressures of input and output ports of the hydraulic motor may be used as the load detector.

Also, according to the present invention, there is provided a rotation control system which comprises a steering angle detector for detecting a steering angle of a steering handle which causes a hollow rotary housing of a Z-type propulsion apparatus to rotate, a rotation angle detector for detecting a rotation angle of the rotary housing, a difference-of-angle detecting circuit for detecting a difference between the steering angle and the rotation angle, a first rotation speed detector for detecting the speed of rotation of the rotary housing, a second rotation speed detector for detecting the speed of rotation of a rotary shaft system for a propeller provided in the rotary housing, a drive device for rotating the rotary housing, a variable limiter circuit for limiting the output of the difference-of-angle detecting circuit in accordance with the output of the second rotation speed detector, and a servo circuit for comparing the output of the variable limiter circuit with the output of the second rotation speed detector to produce a comparison signal in accordance with which the drive device is controlled. In the case of a vessel which is provided with a plurality of Z-type apparatuses each comprising a rotation control system, there may be provided a limiting signal generating circuit for producing an output in accordance with the outputs of the second rotation speed detectors, so that the limiting level of the variable limiter circuit is controlled by the output of the limiting signal generating circuit. Further, in this case, the limiting signal generating circuit may be designed to select a greatest one of the outputs of the second rotation speed detectors.

Further, according to the present invention, there is provided a rotation control system which comprises a steering angle detector for detecting a steering angle of a steering handle which causes a hollow rotary housing of a Z-type propulsion apparatus to rotate, a rotation angle detector for detecting a rotation angle of the rotary housing, a difference-of-angle detecting circuit for detecting a difference between the steering angle and the rotation angle, a rotation speed detector for detecting the speed of rotation of the rotary housing, a vessel speed detector for detecting the speed of a vessel in which the rotary housing is mounted, a drive device for rotating the rotary housing, a variable limiter circuit for limiting the output of the difference-of-angle detecting circuit in accordance with the output of the vessel speed detector, and a servo circuit for comparing the output of the variable limiter circuit with the output of the rotation speed detector to produce a comparison signal in accordance with which the drive device is controlled. In this case, there may be provided a second rotation speed detector for detecting the speed of rotation of a rotary shaft system for a propeller provided in the rotary housing, and an adder for adding the output of the vessel speed detector to the output of the second rotation speed detector, so that the variable limiter circuit limits the output of the difference-of-angle detecting circuit in accordance with the output of the adder.

BRIEF DESCRIPTION OF THE DRAWINGS

FIG. 4 is a block diagram of a first embodiment of this invention;

DESCRIPTION OF THE PREFERRED EMBODIMENTS OF THE INVENTION

Figure 1:
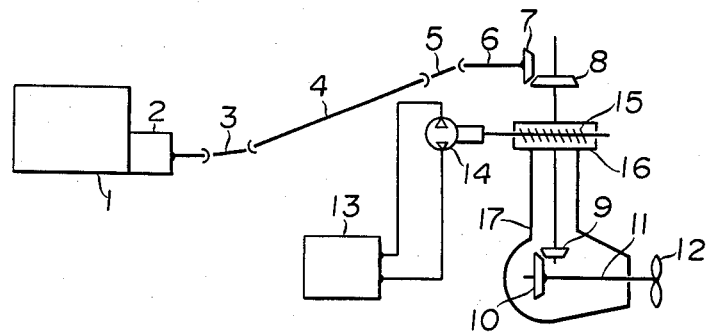
FIG. 1 is a block diagram of a conventional rotation control system for a Z-type propulsion apparatus.

FIG. 4 shows one embodiment of this invention. Reference numeral 14 designates a hydraulic motor which is connected to a worm wheel 16 via a worm 15 formed in a worm shaft 30, the worm wheel 16 being connected to a hollow rotary housing 17 of a Z-type propulsion apparatus. A tachometer (rotation speed detector) 25 is connected to the worm shaft 30 which is connected via gears 31 and 32 to a follow-up potentiometer 23 (follow-up angle detector). A signal outputted from the tachometer 25 is varied in polarity depending on the direction of rotation, and its output terminal is connected to one input terminal of a comparator 33. The output of the follow-up potentiometer 23 is connected to one input terminal of a comparator 34. Connected to the other input terminal of the comparator 34 is a steering potentiometer 22 (steering angle detector) which detects a steering angle of a steering handle 21 which causes the rotary housing 17 to rotate. The comparator 34 is designed to determine the direction of rotation by a difference in voltage between the steering potentiometer 22 and the follow-up potentiometer 23 to output a command signal. The hydraulic motor 14 is connected to a hydraulic pump 37 via pipes 35 and 36, and pressure detectors 38 and 39 for detecting the oil pressures in the input and output ports X and Y of the hydraulic motor 14 are mounted on the pipes 35 and 36, respectively, the oil pressures being detected as positive values, respectively. The pressure detector 38 is connected via a resistor R1 to an inverting input terminal of an operational amplifier 40 and is also connected to one input terminal of a determination circuit 41. The output terminal of the pressure detector 39 is connected via a resistor R2 to the inverting input terminal of the operational amplifier 40 and is also connected to the other input terminal of the determination circuit 41. The determination circuit 41 serves to determine which of the pressures in the ports X and Y of the hydraulic motor 14 is greater.

The non-inverting input terminal of the operational amplifier 40 is grounded via a resistor R3, and a resistor R4 is coupled between the inverting input terminal and output terminal of the operational amplifier 40. The operational amplifier 40 and the resistors R1, R2, R3 and R4 constitute an adder 42 which adds the outputs of the pressure detectors 38 and 39 together. The output terminal of the adder 42 is connected to one terminal of a switch 43 and also to one terminal of a switch 46 via a polarity inverting circuit 45 constituted by an operational amplifier 44 and resistors R5, R6 and R7. When the oil pressure of the port X is greater than that of the port Y, the determination circuit 41 turns on the switch 46 so that the output signal of the adder 42, representative of the sum of the oil pressures of the ports X and Y, is inverted by the circuit 45 and is fed through the switch 46. On the other hand, when the oil pressure of the port Y is greater than that of the port X, the determination circuit 41 turns on the switch 43 so that the output signal of the adder 42, representative of the sum of the oil pressures of the ports X and Y, is fed through the switch 43 without being inverted. The other terminal of each of the switches 43 and 46 is connected to one input terminal of a maximum output limiting circuit 47, and the output terminal of the comparator 34 is connected to the other input terminal of the maximum output limiting circuit 47. The maximum output limiting circuit 47 limits the maximum output of the comparator 34 in inverse proportion to the output of the adder 42 fed thereto via the switch 43 or the switch 46. The output terminal of the maximum output limiting circuit 47 is connected to the other input terminal of the comparator 33, and the output terminal of the comparator 33 is connected to an electromagnetic proportional control valve 48. The comparator 33 compares the output of the maximum output limiting circuit 47 with the output of the tachometer 25 to output a signal representative of a difference therebetween. A port P of the electromagnetic proportional control valve 48 is connected via a pipe 50 to a pilot hydraulic pump 49 which in turn is connected to the hydraulic pump 37. Ports A and B of the electromagnetic proportional control valve 48 are connected via pipes 51 and 52 to opposite ends C and D of a hydraulic cylinder 53. A piston rod 53a of the hydraulic cylinder 53 is connected to a control lever 37a which controls the direction of flow of the oil of the hydraulic pump 37 and a flow rate thereof. The hydraulic pump 37 is connected to the main engine 1 or a drive device 54 such as an electric motor.

The operation of the above rotation control system for the Z-type propulsion apparatus will now be described.

First, when the steering handle is angularly moved, a difference in voltage between the steering angle detector 22 and the follow-up angle detector 23 develops, so that the comparator 34 detects the direction of rotation to output a rotation command signal. At this time, the hydraulic motor 14 is deactivated, and the outputs of the tachometer 25 and the pressure detectors 38 and 39 are "0", and therefore the rotation command signal is fed to the electromagnetic proportional control valve 48 via the maximum output limiting circuit 47 and the comparator 33. As a result, the electromagnetic proportional control valve 48 is opened to move the piston rod 53a of the hydraulic cylinder 53 so that the control lever 37a is angularly moved to cause the hydraulic pump 37 to discharge the oil. As a result, the hydraulic motor 14 is rotated to rotate the rotary housing 17. When the hydraulic motor 14 begins to rotate, the pressure detectors 38 and 39 and the tachometer 25 feed the output signals, respectively.

Figure 5:
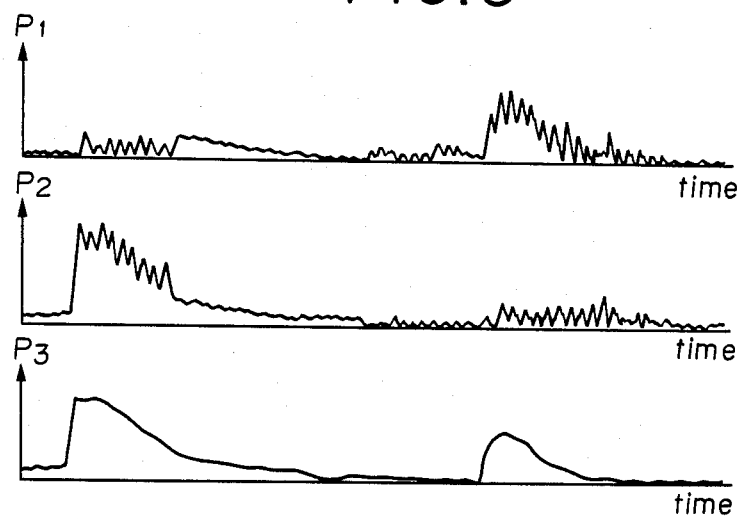
FIG. 5 is an illustration showing waveforms explanatory of the operation of the system of FIG. 4.
Figure 2:
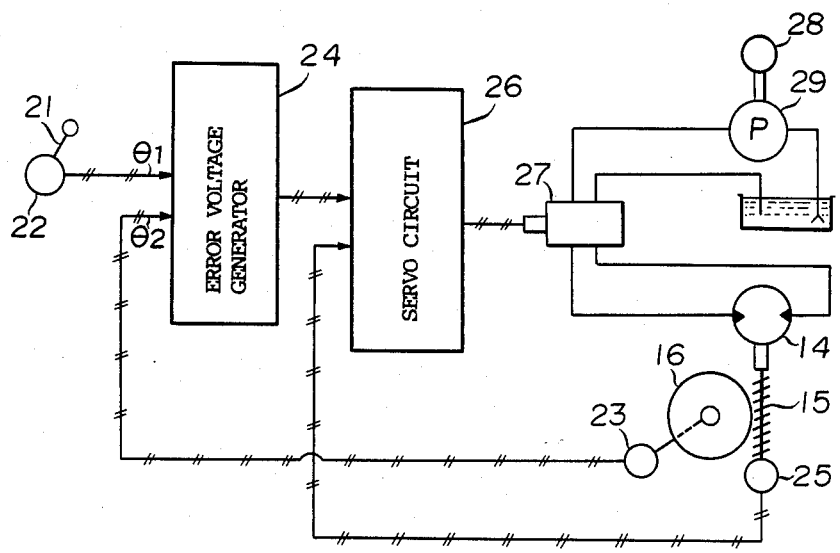
FIG. 2 is a block diagram of another conventional rotation control system.

As shown in FIG. 5, the waveforms P1 and P2 of the outputs of the pressure detectors 38 and 39, representing respectively the oil pressures in the input and output ports of the hydraulic motor 14, are pulsating waveforms, and therefore if the outputs of the pressure detectors 38 and 39 are used directly, the pulsation causes a resonance, a hunting or the like to invite an unstable control. In order to remove this pulsation, an integration circuit may be provided in the circuitry, and alternatively an accumulator may be provided in the hydraulic circuit. However, these methods causes a time lag which invites the hunting. As shown in FIG. 5, when one of the waveforms P1 and P2 of the outputs of the pressure detectors 38 and 39 becomes substantially greater in value, the other becomes substantially smaller. Therefore, since the outputs of the pressure detectors 38 and 39 are added together by the adder 42, the waveform P3 of the output of the adder becomes a stable waveform free of the pulsation (FIG. 5). Then, the determination circuit 41 determines which of the pressures in the ports X and Y of the hydraulic motor 14 is greater, and when the pressure in the port X is higher, the determination circuit turns on the switch 46 and turns off the switch 43. Thus, the output of the adder 42 is inverted by the polarity inverting circuit 45 and is fed as a positive value to the maximum output limiting circuit 47. On the other hand, when the pressure in the port Y is higher, the switch 43 is turned on and the switch 46 is turned off, so that the output of the adder 42 is fed to the maximum output limiting circuit 47 as a negative value in a non-inverting manner.

When the sum of the outputs of the pressure detectors 38 and 39 so obtained is inputted into the maximum output limiting circuit 47, the maximum output of the comparator 34 is limited in accordance with the sum of the outputs of the pressure detectors 38 and 39 and is fed to the comparator 33, the maximum output being limited in inverse proportion to the sum of the outputs of the pressure detectors 38 and 39. The comparator 33 compares the output of the maximum output limiting circuit 47 with the output of the tachometer 25 to output a signal, representative of a difference between these two outputs, to the electromagnetic proportional control valve 48. The electromagnetic proportional control valve 48 is gradually opened, and when the output of the maximum output limiting circuit 47 coincides with the output of the tachometer 25, the output of the comparator 33 is rendered "0", and the electromagnetic proportional control valve 48 is closed. Therefore, the piston rod 53a is stopped, and the control lever 37a ceases to be angularly moved, so that the hydraulic pump 37 discharges a constant amount of the oil. As a result, the hydraulic motor 14 stops to increase its rotational speed and is rotated at a constant speed of rotation, so that the rotary housing 17 is also rotated at a constant speed.

When the rotation load of the rotary housing 17 of the Z-type propulsion apparatus is increased due to the increasing of the speed of the vessel or the like during the time when the rotary housing 17 is rotated at a constant speed, the pressures detected by the pressure detectors 38 and 39 are increased, and the output of the maximum output limiting circuit 47 is decreased. As a result, the output of the comparator 33 becomes negative, and the electromagnetic proportional control valve 48 is opened in the reverse direction. Then, the piston rod 53a of the hydraulic cylinder 53 begins to be moved toward its original position, and therefore the amount of discharge of the oil from the hydraulic pump 37 is decreased, so that the speed of rotation of the hydraulic motor 14 is decreased to decrease the speed of rotation of the rotary housing 17. As a result, the output of the tachometer 25 is decreased and is caused to coincide with the output of the maximum output limiting circuit 47 whereupon the output of the comparator 33 is rendered "0". Therefore, the electromagnetic proportional control valve 48 is closed so that the amount of discharge of the oil from the hydraulic pump 37 becomes constant. As a result, the hydraulic motor 14 is rotated at a constant speed, and the rotary housing 17 is also rotated at a constant speed. On the other hand, when the rotation load of the rotary housing 17 is decreased due to the decreasing of the speed of the vessel or the like, the reverse of the above operation is encountered. More specifically, the pressures detected by the pressure detectors 38 and 39 are decreased, and the output of the maximum output limiting circuit 47 is increased. Therefore, the output of the comparator 33 is rendered positive, and the electromagnetic proportional control valve 48 is opened in the direction to increase the amount of discharge of the oil from the hydraulic pump 37. As a result, the speed of rotation of the hydraulic motor 14 is increased so that the speed of rotation of the rotary housing 17 is also increased.

When the rotary housing 17 approaches its target position, the difference in voltage between the two angle detectors 22 and 23 becomes smaller, and the output of the comparator 34 is decreased. Therefore, the electromagnetic proportional control valve 48 is opened in the direction to decrease the amount of discharge of the oil from the hydraulic pump 37 so that the speed of rotation of the hydraulic motor 14 is gradually decreased. Then, when the difference in voltage between the two angle detectors 22 and 23 becomes "0", the output of the comparator 34 is rendered "0", and the outputs of the maximum output limiting circuit 47 and the comparator 33 are rendered "0". Therefore, the electromagnetic proportional control valve 48 is closed, and the hydraulic pump 37 and the hydraulic motor 14 are stopped, so that the rotation of the rotary housing 17 of the Z-type propulsion apparatus is stopped.

Figure 6:
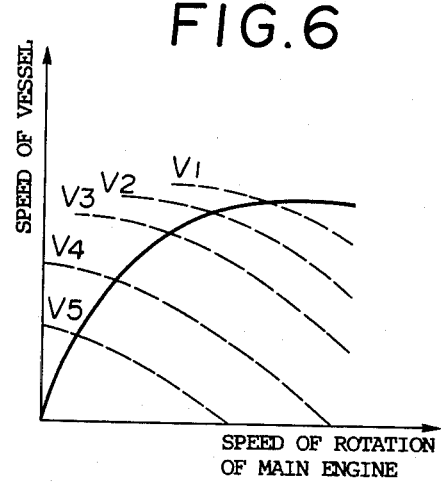
FIGS. 6 and 7 are illustrations showing characteristics of the operation of the system of FIG. 4 and the conventional system, respectively.
Figure 7:
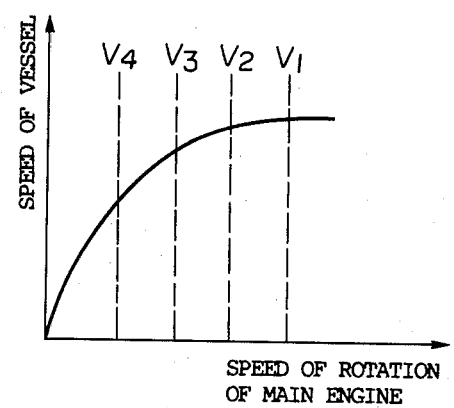

In the rotation control system of this embodiment, since the rotation of the rotary housing 17 of the Z-type propulsion apparatus can be controlled in this manner, the speed of rotation is increased as indicated by broken lines V1 to V5 in FIG. 6. Therefore, in comparison with a conventional system in which the speed of rotation of the rotary housing 17 is controlled in inverse proportion to the speed of rotation of the main engine as shown in FIG. 7, the system according to the present invention can achieve a higher speed of rotation when the speed of rotation of the main engine is high with the speed of the vessel being low. In addition, when the speed of rotation of the main engine is low with the speed of the vessel being high, the speed of rotation can be restrained. Therefore, the overload area, i.e., the area beyond the solid line in FIG. 7 becomes smaller. In FIGS. 6 and 7, the solid curved lines indicate the condition in which the vessel travels by itself.

Figure 8:
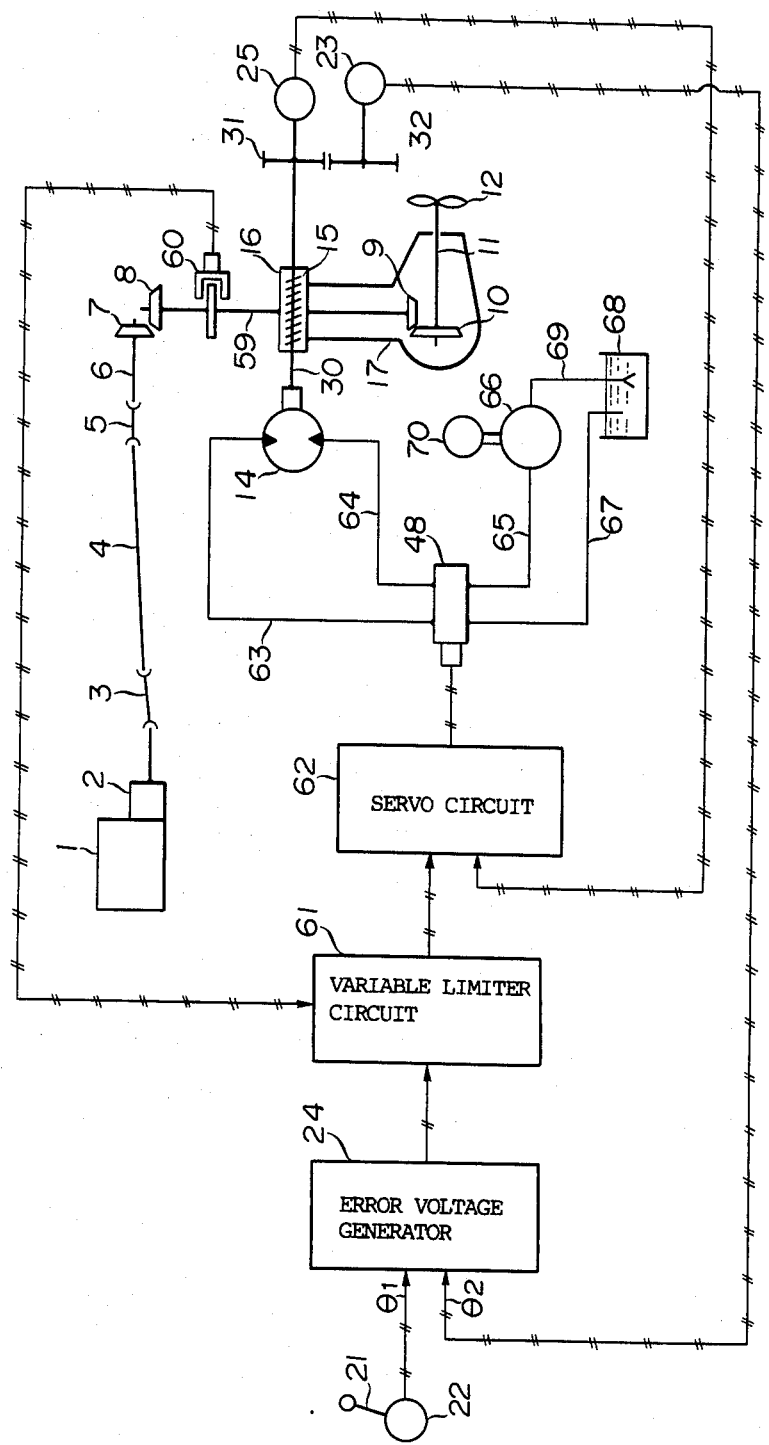
FIG. 8 is a block diagram of a second embodiment of this invention.

FIG. 8 shows a second embodiment of the present invention. In this Figure, a propeller revolution detector 60 for detecting the number of revolution of the propeller 12 is mounted on a vertical shaft 59 which connects bevel gears 7 and 8 together.

A rotation angle detector 23 is connected to one input terminal of an error voltage generator 24. Connected to the other input terminal of the error voltage generator 24 is a steering angle detector 22 for detecting the steering angle of a steering handle 21 which causes a rotary housing 17 to be rotated. The error voltage generator 24 is designed to produce an error voltage in accordance with a difference ($\theta 1 - \theta 2$) (difference of angle) between the detection value $\theta 1$ of the steering angle detector 22 and the detection value $\theta 2$ the rotation angle detector 23. The error voltage generator 24 is connected to one input terminal of a variable limiter circuit 61, and the output terminal of the propeller revolution detector 60 is connected to the other input terminal of the variable limiter circuit 61. The variable limiter circuit 61 is designed to limit the output of the error voltage generator 24 in accordance with the output of the propeller revolution detector 60. Also, the output terminal of the variable limiter circuit 61 is connected to one input terminal of a servo circuit 62, and an output terminal of a rotation speed detector 25 is connected to the other input terminal of the servo circuit 62. The servo circuit 62 is designed to output a servo signal to a flow rate and direction control valve 48 such as an electromagnetic proportional control valve so that the output of the variable limiter circuit 61 coincides with the detection value of the rotation speed detector 25.

The flow rate and direction control valve 48 is connected to a hydraulic motor 14 via pipes 63 and 64, and to a hydraulic pump 66 via a pipe 65 and to an oil tank 68 via a pipe 67. The hydraulic pump 66 and the oil tank 68 are connected together by a pipe 69, and a motor 70 is connected to the hydraulic pump 66.

The operation of this rotation control system will now be described.

Figure 3:
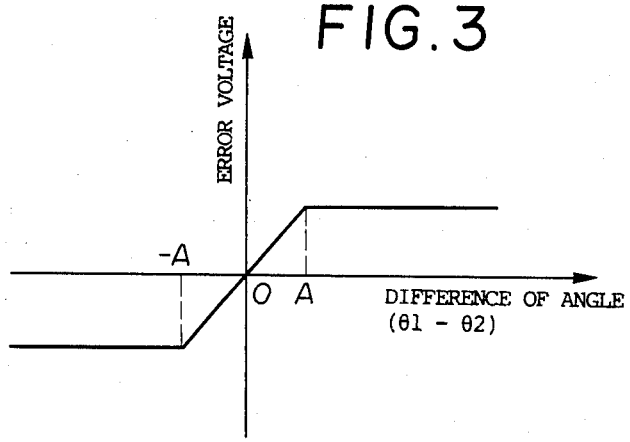
FIG. 3 is an illustration showing characteristics of the operation of the control system of FIG. 2.
Figure 9:
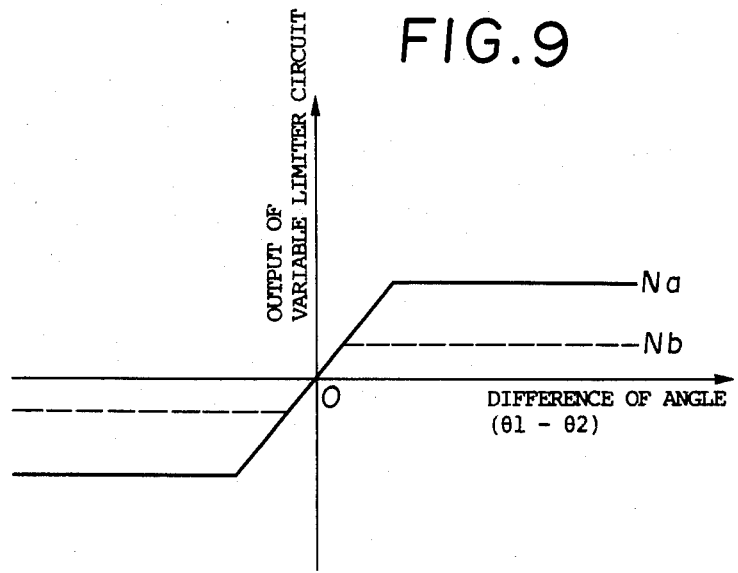
FIGS. 9 and 10 are illustrations showing characteristics of the operation of the system of FIG. 8.

First, the main engine 1 is rotated, and a clutch 2 is connected, so that the rotation of the main engine 1 is transmitted to an input shaft 6 via a universal joint 3, an intermediate shaft 4 and a universal joint 5. The rotation of the input shaft 6 is transmitted to a propeller shaft 11 via bevel gears 7 and 8, the vertical shaft 59 and bevel gears 9 and 10 so that the propeller 12 is rotated to advance the vessel. In this condition, when the steering handle 21 is angularly moved, the steering angle detector 22 outputs a detection value $\theta1$ representative of the steering angle to the error voltage generator 24. At this time, since the rotary housing has not yet been rotated, the detection value $\theta2$ of the rotation angle detector 23 is "0". Then, the error voltage generator 24 produces an error voltage in accordance with the difference ($\theta1-\theta2$) (difference of angle) between the detection value $\theta1$ of the steering angle detector 22 and the detection value $\theta2$ of the rotation angle detector 23, this error voltage being similar to that produced by the conventional error voltage generator 24 in FIG. 3. The error voltage produced by the error voltage generator 24 is limited by the variable limiter circuit 61 in accordance with the output of the propeller revolution detector 60. As the number of revolution of the propeller varies from a small value Na (i.e., the speed of the vessel is low) to a greater value Nb (i.e., the speed of the vessel is high), the maximum and minimum values of the error voltage are restricted as shown in FIG. 9. Therefore, as the speed of the vessel becomes higher, the absolute value of the output of the variable limiter circuit 61 at the same difference of angle ($\theta1-\theta2$) becomes smaller. The output of the variable limiter circuit 61 is inputted to the servo circuit 62, and the flow rate and direction control valve 48 is controlled by the output (servo signal) of the servo circuit 62, so that the amount of feed of oil from the hydraulic pump 66 to the hydraulic motor 14 as well as the direction of feed of oil is controlled. Therefore, the hydraulic motor 14 is rotated in the thus selected direction at a speed determined by the amount of feed of oil to thereby rotate the rotary housing 17. When the rotary housing 17 begins to rotate, the detection value of the rotation speed detector 25 is inputted to the servo circuit 62, so that the servo circuit 62 outputs the servo signal to the flow rate and direction control valve 48 so as to cause the output of the variable limiter circuit 61 to coincide with the speed of rotation of the rotary housing 17. As a result, the speed of rotation of the rotary housing 17 coincides with the output of the variable limiter circuit 61, and the rotary housing 17 continues to rotate in this condition. The detection value $\theta2$ of the rotation angle detector 23 becomes greater in accordance with the rotation of the rotary housing 17 and is inputted to the error voltage generator 24, so that the difference of angle ($\theta1-\theta2$) becomes smaller gradually. Then, when the detection value $\theta1$ of the steering angle detector 22 coincides with the detection value $\theta2$ of the rotation angle detector 23, the difference of angle ($\theta1-\theta2$) is rendered "0", and the output of the error voltage generator 24 is rendered "0". As a result, the output of the variable limiter circuit 61 is rendered "0", and this result is inputted to the servo circuit 62. Therefore, the flow rate and direction control valve 48 is controlled by the servo signal of the servo circuit 62 to stop the feed of oil from the hydraulic pump 66 to the hydraulic motor 14, so that the rotation of the hydraulic motor 14 is stopped to stop the rotary housing 17.

Figure 10:
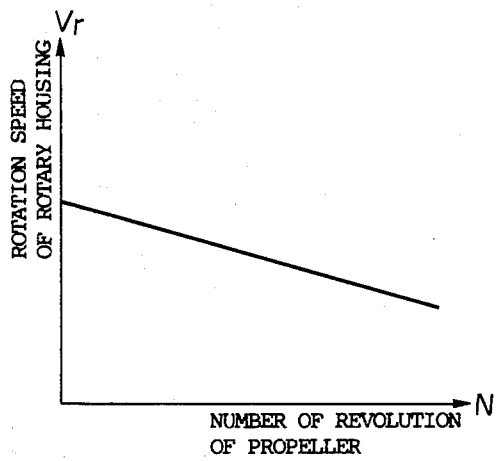

In this manner, the rotary housing 17 is rotated in accordance with the steering angle of the steering handle 21. At this time, the variable limiter circuit 61 controls the output. Therefore, as shown in FIG. 10, when the number N of revolution of the propeller is great (i.e., the speed of the vessel is high), the speed Vr of rotation of the rotary housing 17 becomes small. On the other hand, when the number N of revolution of the propeller is small (i.e., the speed of the vessel is low), the speed Vr of the rotary housing 17 becomes greater.

Each of the rotation angle detector 23 and the steering angle detector 22 may be of any type such as a potentiometer, a synchro and an angle detector of the optical type so long as it can detects an angle. Also, each of the rotation speed detector 25 and the propeller revolution detector 60 may be of any type such as a magnet disc and a tachometer generator so long as it can detect the speed of rotation.

In the case where a plurality of Z-type propulsion apparatuses each having the rotation control system is installed in the vessel, the propeller of each propulsion device is driven by an individual main engine, and therefore the numbers of revolution of the propellers are different from one another. With the system in this embodiment, the speeds of rotation of the rotary housings are not in synchronism with one another, and therefore it is possible that the vessel is directed in a direction different from that intended by the steering operation.

Figure 11:
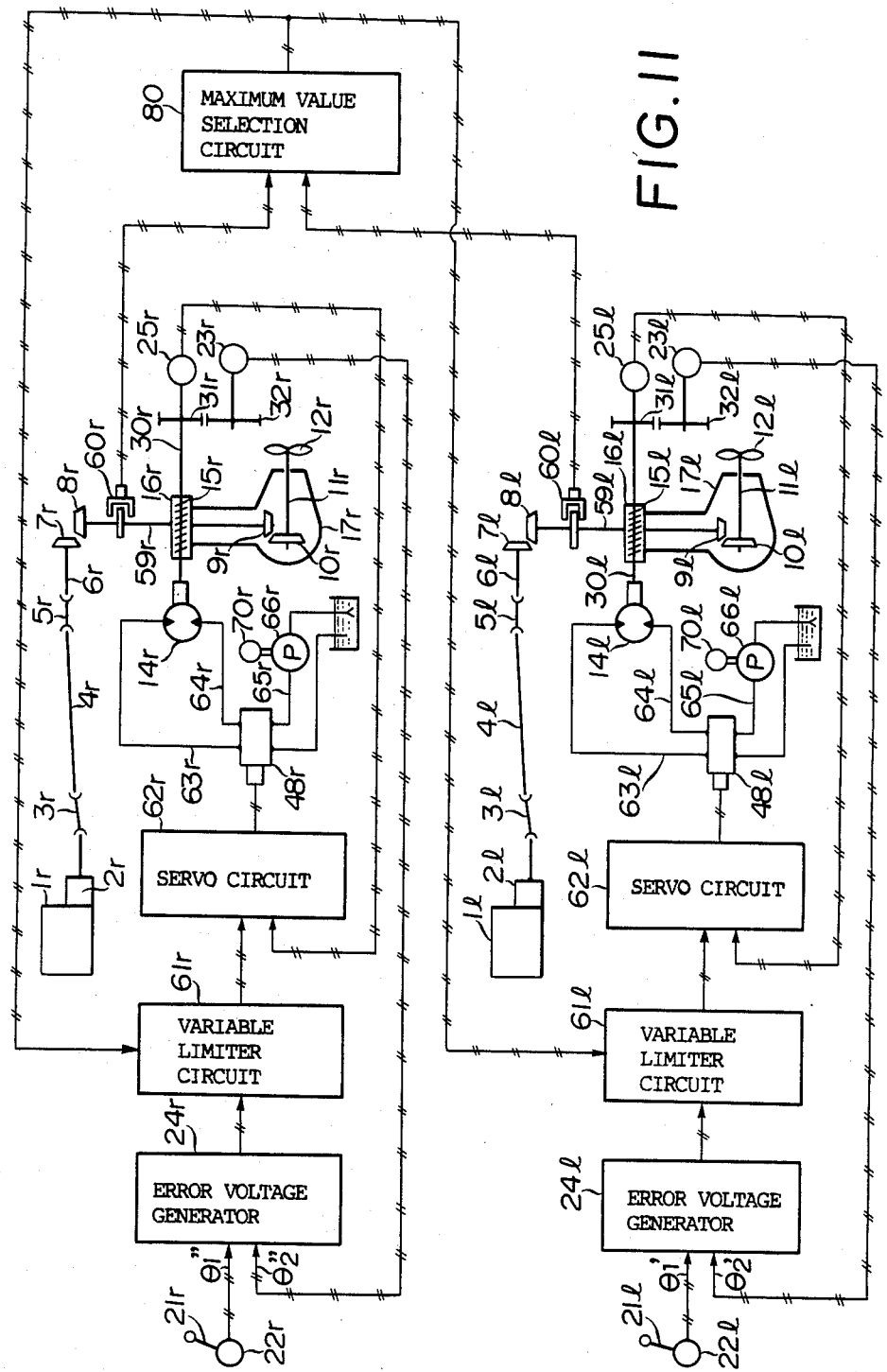
FIG. 11 is a block diagram of a third embodiment of this invention.

A third embodiment of this invention shown in FIG. 11 deals with this problem.

In this figure, the parts corresponding to those in FIG. 8 are designated by like reference characters. The parts of the system mounted on the left side of the vessel are identified by a suffix l while the parts of the system mounted on the right side of the vessel are identified by a suffix r. Output terminals of propeller revolution detectors 60l and 60r are connected to a maximum value selection circuit (limiting signal generating circuit) 80, the maximum value selection circuit 80 being designed to select the maximum value of the number of revolution of the propeller detected by each of the propeller revolution detectors 60l and 60r. The output terminal of the maximum value selection circuit 80 is connected to variable limiter circuits 61l and 60r. The maximum value selection circuit 80 may be replaced by a selection circuit for selecting the average value or the minimum value.

The operation of this system will now be described.

When a pair of steering handles 21l and 21r are angularly moved to turn the vessel during the advancing of the vessel, error voltage generators 24l and 24r output error voltages to the variable limiter circuits 61l and 61r in accordance with a difference ($\theta'1-\theta'2$) between the detection value $\theta'1$ of a steering angle detector 22l and the detection value $\theta'2$ of a rotation angle detector 23l and a difference ($\theta''1-\theta''2$) between the detection value $\theta''1$ of a steering angle detector 22r and the detection value $\theta''2$ of a rotation angle detector 23r, as described above for the error voltage generator in FIG. 3. At this time, the maximum value selection circuit 80 to which the number of revolution of the propellers detected by the propeller revolution detectors 60l and 60r are inputted selects the maximum value of these revolution numbers and outputs a signal representative thereof to the respective variable limiter circuits 61l and 61r. The variable limiter circuits 61l and 61r limit the outputs (error voltages) of the error voltage generators 24l and 24r in accordance with the output of the maximum value selection circuit 80 representative of the maximum value of the number of revolution of the propellers. Thus, the outputs of the variable limiter circuits 61*l* and 61*r* are limited by the same value, i.e., the maximum value of the numbers of revolution of the propellers, and therefore the variable limiter circuits 61*l* and 61*r* feed voltage to the respective servo circuit 62*l* and 62*r* in accordance with the same output curve. Therefore, the maximum and minimum values of the outputs of the variable limiter circuits 61*l* and 61*r* are limited as shown in FIG. 9. The servo circuit 62*l* and 62*r* to which the outputs of the respective variable limiter circuits 61*l* and 61*r* have been inputted output the servo signals to control the respective flow rate and direction control valves 48*l* and 48*r*, so that the respective hydraulic motors 14*l* and 14*r* are rotated to rotate the respective rotary housings 17*l* and 17*r*. When the rotary housings 17*l* and 17*r* begin to rotate, the detection values of rotation speed detectors 25*l* and 25*r* are inputted to the respective servo circuits 62*l* and 62*r* which in turn output servo signals to the respective flow rate and direction control valves 48*l* and 48*r* so as to cause the speeds of rotation of the rotary housings 17*l* and 17*r* to coincide with the outputs of the respective variable limiter circuits 61*l* and 61*r*. As a result, the speeds of rotation of the rotary housings 17*l* and 17*r* coincide with the outputs of the respective variable limiter circuits 61*l* and 61*r* controlled by the output of the maximum value selection circuit 80, and the rotary housings 17*l* and 17*r* continues to rotate. The detection values $\theta'2$ and $\theta''2$ of the rotation angle detectors 23*l* and 23*r* approach the detection values $\theta'1$ and $\theta''1$ of the steering angle detectors 22*l* and 22*r* in accordance with the rotations of the rotary housings 17*l* and 17*r*, so that the differences of angle $(\theta'1-\theta'2)$ and $(\theta''1-\theta''2)$ become smaller gradually. Then, when the detection values $\theta'1$ and $\theta''1$ of the steering angle detectors 22*l* and 22*r* coincide with the detection values $\theta'2$ and $\theta''2$ of the rotation angle detectors 23*l* and 23*r*, respectively, the differences of angle $(\theta'1-\theta'2)$ and $(\theta''1-\theta''2)$ are rendered "0", and the outputs of the error voltage generators 24*l* and 24*r* are rendered "0". Therefore, the outputs of the variable limiter circuits 61*l* and 61*r* are rendered "0". As a result, the flow rate and direction control valves 48*l* and 48*r* are controlled by the servo signals of the servo circuits 62*l* and 62*r* to stop the hydraulic motors 14*l* and 14*r* so that the rotations of the rotary housings 17*l* and 17*r* are stopped.

Thus, the rotary housings 17*l* and 17*r* are rotated in accordance with the steering angles of the steering handles 21*l* and 21*r*, respectively. At this time, the variable limiter circuits 61*l* and 61*r* limit their respective outputs in accordance with the output (the maximum value of the numbers of revolution of the propellers) of the maximum value selection circuit 80, so that the speeds of rotation of the rotary housing 17*l* and 17*r* synchronize each other. Therefore, when the output of the maximum value selection circuit 80 is great, the speeds of rotation of the rotary housings 17*l* and 17*r* are low. On the other hand, when the output of the maximum value selection circuit 80 is small, the speeds of rotation of the rotary housings 17*l* and 17*r* are high.

If the steering handles 21*l* and 21*r* are operated independently, the rotary housing 17*l* and 17*r* are rotated in synchronism with each other in accordance with the output of the maximum value selection circuit 80. This embodiment has been described with reference to the vessel having the pair of propulsion apparatuses, but this invention can be applied to a vessel having more than two Z-type propulsion apparatuses. Although in this embodiment the detection signal representative of the number of revolution of each of the propellers is used for limiting the error voltage, it may be replaced by a signal representing the number of revolution of each of other parts such as the main engines and the propeller drive shaft systems.

Figure 12:
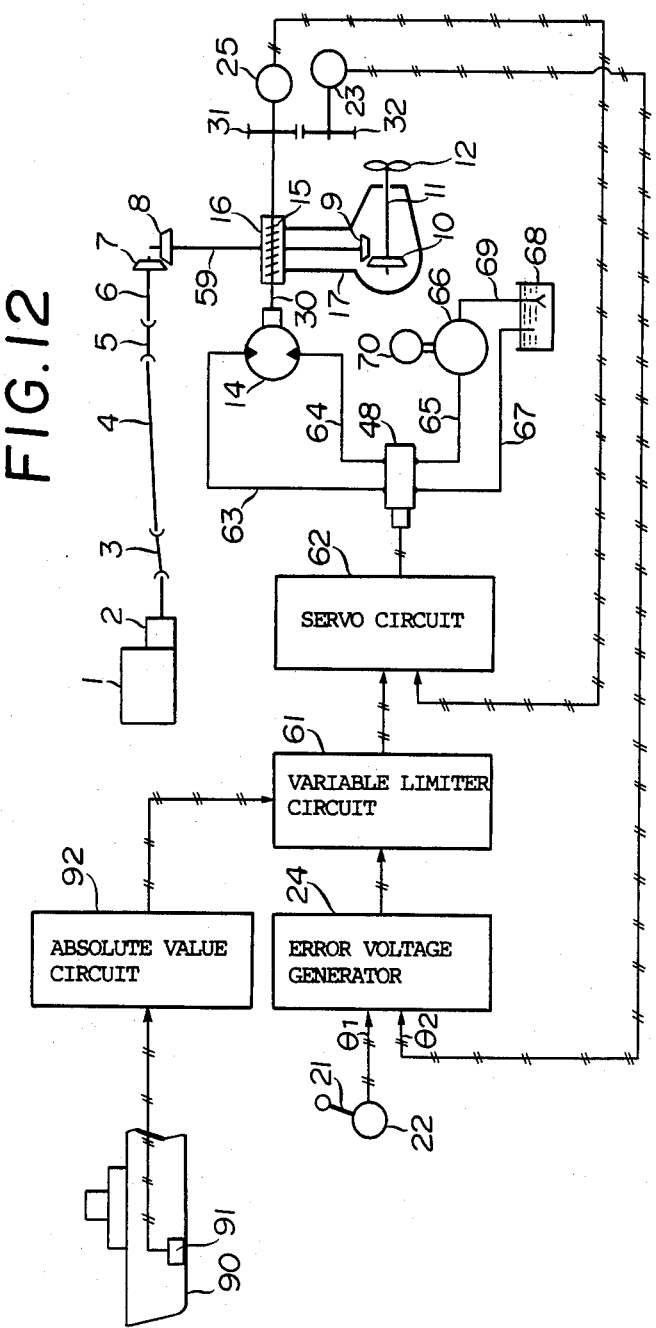
FIG. 12 is a block diagram of a fourth embodiment of this invention.

FIG. 12 shows a fourth embodiment of this invention. The fourth embodiment differs from the embodiment of FIG. 8 in that the amplitude of the error voltage is limited in accordance with the speed of the vessel. More specifically, a hull 90 comprising the Z-type propulsion apparatus in this embodiment is equipped with a vessel speed detector 91 for detecting the speed of the vessel, such as an electromagnetic log and a Doppler sonar. The output of the vessel speed detector 91 is fed to a variable limiter circuit 61 via an absolute value circuit 92. The absolute value circuit 92 is provided because the output of the vessel speed detector 91 becomes negative when the vessel moves rearwardly.

The operation of this system will now be described.

Figure 13:
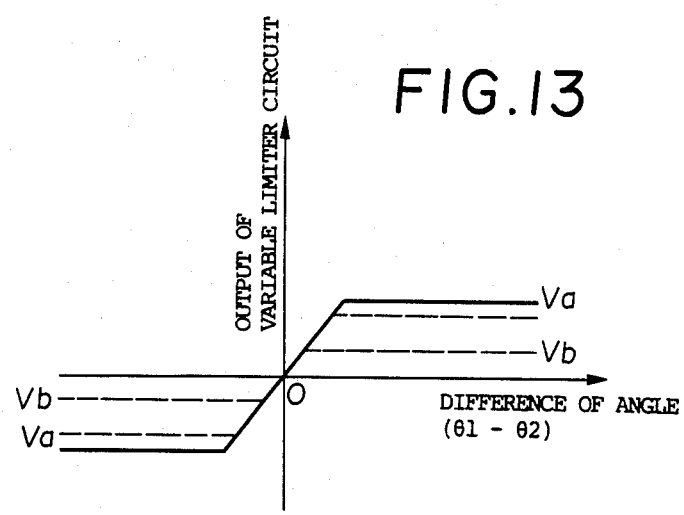
FIGS. 13 and 14 are illustrations showing characteristics of the operation of the system of FIG. 12.

When a steering handle 21 is operated, an error voltage generator 24 outputs an error voltage corresponding to a difference between an output 81 of a steering angle detector 22 and an output 82 of a rotation angle detector 23. The error voltage generated by the error voltage generator 24 is limited by the variable limiter circuit 61 to within a range of between predetermined upper and lower limits in accordance with the absolute value of the output of the vessel speed detector 91. More specifically, when the absolute value of the vessel speed is relatively small, the output of the variable limiter circuit 61 is limited by a great voltage as indicated in a broken line Va in FIG. 13. When the absolute value of the vessel speed is relatively great, the output is limited by a small voltage as indicated in a broken line Vb in FIG. 13. Also, when the vessel speed is moderate, the output of the variable limiter circuit 61 is indicated by a line (not shown) between the broken lines Va and Vb. The output of the variable limiter circuit 61 is inputted to a servo circuit 62, and a flow rate and direction control valve 48 is controlled by the output (servo signal) of the servo circuit 62 to control the amount of feed of oil from a hydraulic pump 66 to a hydraulic motor 14 and the direction of feed of the oil, so that the hydraulic motor 14 is rotated in the selected direction at a speed corresponding to the amount of feed of the oil, thereby rotating the rotary housing 17.

Figure 14:
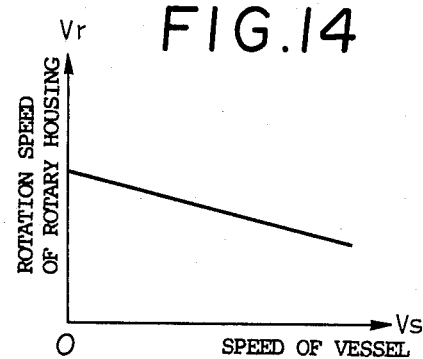
Figure 16:
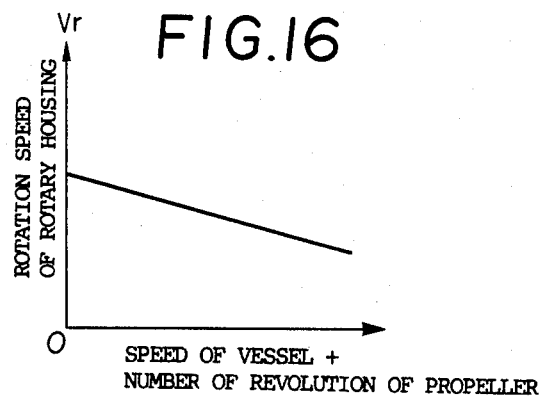
FIG. 16 is an illustration showing characteristics of the operation of the system of FIG. 15.

In this embodiment, the rotary housing 17 is rotated in accordance with the steering angle of the steering handle 21, and at this time the variable limiter circuit 61 limits its output in accordance with the absolute value of the vessel speed. Therefore, when the vessel speed Vs is high as shown in FIG. 14, the speed Vr of rotation of the rotary housing 17 becomes small. On the other hand, when the vessel speed Vs is low, the speed Vr of rotation of the rotary housing becomes high.

Figure 15:
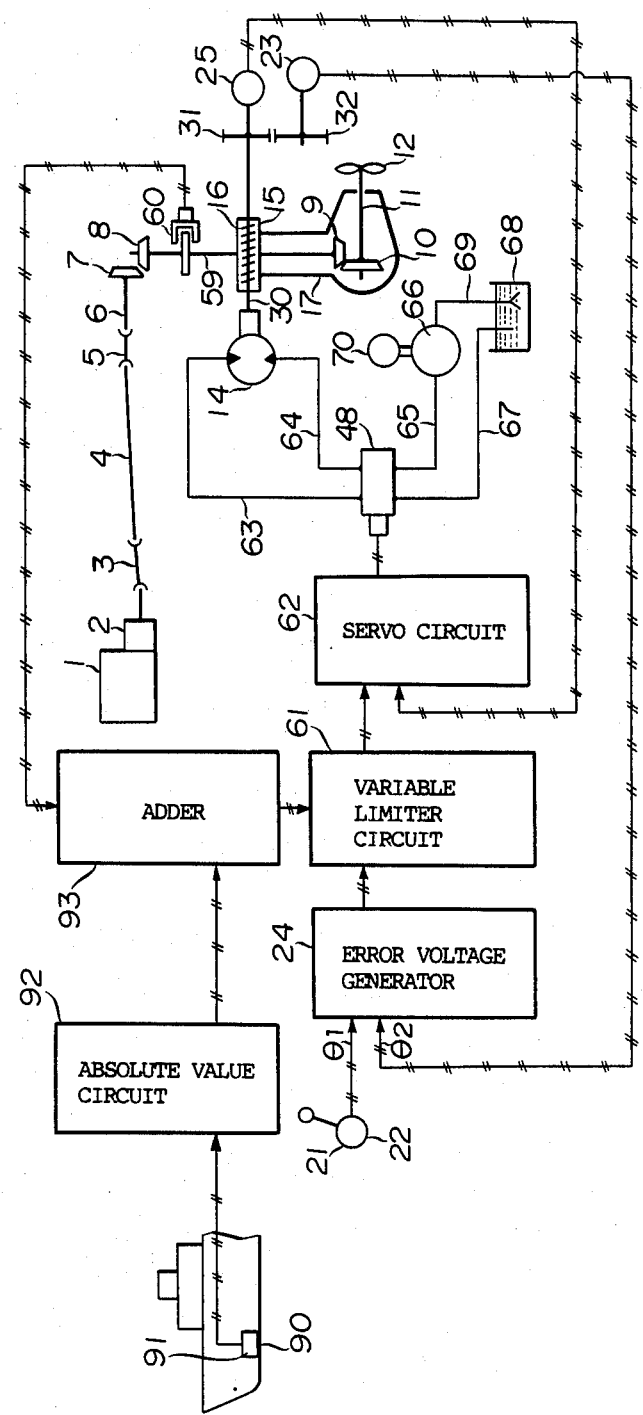
FIG. 15 is a block diagram of a fifth embodiment of this embodiment.

A fifth embodiment of this invention will now be described with reference to FIG. 15. In this embodiment, a propeller revolution detector 60 for detecting the number of revolution of a drive shaft system for a propeller 12 is mounted on a vertical shaft 59. An adder 93 adds the output of the propeller revolution detector 60 to the absolute value of the output of a vessel speed detector 91 obtained through an absolute value circuit 92, and the output of the adder 93 is inputted to a variable limiter circuit 61. The other parts are similar to those of the fourth embodiment shown in FIG. 12 and are designated by like reference characters.

In the rotation control system of the above construction, an error voltage generated by an error voltage generator 24 is limited by a variable limiter circuit 61 to within a range of between predetermined upper and lower limits in accordance with the sum of the absolute value of the output of the vessel speed detector 91 and the output of the propeller revolution detector 60. Then, the rotation of the rotary housing 17 is controlled in accordance with the output of the variable limiter circuit 61 as described above for the fourth embodiment.

Since the output of the error voltage generator 24 is limited by the variable limiter circuit 61 in accordance with the sum of the values of the vessel speed and the number of revolution of the propeller, the speed Vr of rotation of the rotary housing 17 is low when this sum is large. And when this sum is small, the speed Vr of rotation of the rotary housing 17 is large. More specifically, a tug boat equipped with the rotation control apparatus according to the present invention advances at high speed alone, the tug boat is turned at a low speed when the steering handle 21 is operated since the speed of the tug boat is high with the number of revolution of the propeller being large. On the other hand, when the tug boat advances at a low speed alone, the tug boat is turned at a high speed when the steering handle 21 is operated since the speed of the tug boat is low with the number of revolution of the propeller being small. In the case where the tug boat tugs a vessel, that is, the speed of the tug boat is low with the number of revolution of the propeller being large, or where the tug boat is tugged by a vessel, that is, the speed of the tug boat is high with the number of revolution of the propeller being small, the tug boat is turned at a speed intermediate between the above-mentioned high and low speeds. Therefore, when the rotary housing 17 is caused to rotate, an undue force is not exerted on the rotary housing 17 so that the rotary housing can be rotated smoothly, and regardless of the case where the tug boat advances alone, where the tug boat tugs a vessel, or where the tug boat is tugged by a vessel, a safe and good steering performance is obtained. The system can be applied to a vessel comprising a plurality of Z-type propulsion apparatuses in which the speed of the vessel is not proportional to the numbers of revolution of the propellers.

APPLICABILITY TO INDUSTRIES

Thus, the present invention can be quite advantageous where the vessel such as the tug boat is required to make a small turn quickly and where the vessel, subjected to a force from another vessel, is turned.

What is claimed is:

1. A rotation control system comprising a steering angle detector means for detecting a steering angle of a steering handle which causes a hollow rotary housing of a Z-type propulsion apparatus to rotate, a rotation angle detector means for detecting a rotation angle of the rotary housing, a difference-of-angle detecting means for detecting a difference between the steering angle and the rotation angle, a drive device for rotating the rotary housing, a load detector means for detecting the load of the drive device, and a drive control means for limiting the output of the difference-of-angle detecting means in accordance with the output of the load detector means so as to control the drive device in accordance with the limited output.

2. A rotation control system according to claim 1, in which the drive device comprises a hydraulic motor, the load detector means comprising pressure detectors for detecting pressures of oil at input and output ports of the hydraulic motor, respectively.

3. A rotation control system comprising a steering angle detector means for detecting a steering angle of a steering handle which causes a hollow rotary housing of a Z-type propulsion apparatus to rotate, a rotation angle detector means for detecting a rotation angle of the rotary housing, a difference-of-angle detecting means for detecting a difference between the steering angle and the rotation angle, a first rotation speed detector means for detecting the speed of rotation of the rotary housing, a second rotation speed detector for detecting the speed of rotation of a rotary shaft system for a propeller provided in the rotary housing, a drive device for rotating the rotary housing, a variable limiter circuit for limiting the output of the difference-of-angle detecting means in accordance with the output of the second rotation speed detector means, and a servo circuit for comparing the output of the variable limiter circuit with the output of the first rotation speed detector means to produce a comparison signal in accordance with which the drive device is controlled.

4. A rotation control system comprising a steering angle detector means for detecting a steering angle of a steering handle which causes a hollow rotary housing of a Z-type propulsion apparatus to rotate, a rotation angle detector means for detecting a rotation angle of the rotary housing, a difference-of-angle detecting means for detecting a difference between the steering angle and the rotation angle, a rotation speed detector means for detecting the speed of rotation of the rotary housing, a vessel speed detector means for detecting the speed of a vessel in which the rotary housing is mounted, a drive device for rotating the rotary housing, a variable limiter circuit for limiting the output of the difference-of-angle detecting means in accordance with the output of the vessel speed detector means, and a servo circuit for comparing the output of the variable limiter circuit with the output of the rotation speed detector to produce a comparison signal in accordance with which the drive device is controlled.

5. A rotation control system according to claim 4, further comprising a second rotation speed detector means for detecting the speed of rotation of a rotary shaft system for a propeller provided in the rotary housing, and an adder means for adding the output of the vessel speed detector means to the output of the second rotation speed detector means, the variable limiter circuit limiting the output of the difference-of-angle detecting means in accordance with the output of the adder means.

6. A rotation control unit comprising a plurality of rotation control systems according to claim 3, in which there is provided a limiting signal generating circuit for producing an output in accordance with the outputs of the second rotation speed detector means, so that the limiting level of the variable limiter circuit is controlled by the output of the limiting signal generating circuit.

7. A rotation control unit according to claim 6, in which the limiting signal generating circuit selects a greatest one of the outputs of the second rotation speed detector means to output it.

* * * * *